US008396331B2

(12) United States Patent
Jia et al.

(10) Patent No.: US 8,396,331 B2
(45) Date of Patent: Mar. 12, 2013

(54) GENERATING A MULTI-USE VOCABULARY BASED ON IMAGE DATA

(75) Inventors: Menglei Jia, Beijing (CN); Xing Xie, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1162 days.

(21) Appl. No.: 11/831,862

(22) Filed: Jul. 31, 2007

(65) Prior Publication Data
US 2008/0205770 A1 Aug. 28, 2008

Related U.S. Application Data

(60) Provisional application No. 60/891,662, filed on Feb. 26, 2007.

(51) Int. Cl.
G06K 9/54 (2006.01)
(52) U.S. Cl. .......................... 382/305; 382/306; 707/736
(58) Field of Classification Search ........... 382/305–306
See application file for complete search history.

(56) References Cited

U.S. PATENT DOCUMENTS

| | | | | |
|---|---|---|---|---|
| 4,553,261 A * | 11/1985 | Froessl | | 382/306 |
| 4,574,395 A * | 3/1986 | Kato | | 382/306 |
| 4,748,678 A * | 5/1988 | Takeda et al. | | 382/306 |
| 5,440,651 A * | 8/1995 | Martin | | 382/156 |
| 5,754,712 A * | 5/1998 | Tanaka et al. | | 382/306 |
| 5,850,490 A * | 12/1998 | Johnson | | 382/306 |
| 5,852,823 A * | 12/1998 | De Bonet | | 382/279 |
| 5,917,958 A * | 6/1999 | Nunally et al. | | 382/276 |
| 6,052,494 A * | 4/2000 | Ohtani | | 382/306 |
| 6,173,275 B1 * | 1/2001 | Caid et al. | | 706/14 |
| 6,189,002 B1 * | 2/2001 | Roitblat | | 1/1 |
| 6,236,768 B1 * | 5/2001 | Rhodes et al. | | 382/306 |
| 6,253,201 B1 * | 6/2001 | Abdel-Mottaleb et al. | | 1/1 |
| 6,263,121 B1 * | 7/2001 | Melen et al. | | 382/305 |
| 6,366,908 B1 * | 4/2002 | Chong et al. | | 1/1 |
| 6,411,953 B1 * | 6/2002 | Ganapathy et al. | | 1/1 |
| 6,487,554 B2 * | 11/2002 | Ganapathy et al. | | 1/1 |
| 6,584,465 B1 * | 6/2003 | Zhu et al. | | 1/1 |
| 6,594,650 B2 * | 7/2003 | Hasuo et al. | | 1/1 |
| 6,606,417 B1 * | 8/2003 | Brechner | | 382/240 |
| 6,625,335 B1 * | 9/2003 | Kanai | | 382/306 |
| 6,674,923 B1 * | 1/2004 | Shih et al. | | 382/305 |
| 6,732,119 B2 * | 5/2004 | Ganapathy et al. | | 1/1 |

(Continued)

FOREIGN PATENT DOCUMENTS

KR 20000054860 9/2000
KR 20010106555 12/2001

OTHER PUBLICATIONS

Nister, D. et al., "Scalable Recognition with a Vocabulary Tree", 2006, IEEE Computer Society Conference on Computer Vsion and Pattern Recognition, p. 1-8.*

(Continued)

Primary Examiner — Matthew Bella
Assistant Examiner — Gandhi Thirugnanam
(74) Attorney, Agent, or Firm — Lee & Hayes, PLLC

(57) ABSTRACT

Functionality is described for generating a vocabulary from a source dataset of image items or other non-textual items. The vocabulary serves as a tool for retrieving items from a target dataset in response to queries. The vocabulary has at least one characteristic that allows it to be used to retrieve items from multiple different target datasets. A target dataset can have a different size than the source dataset and/or a different type than the source dataset. The enabling characteristic may correspond to a size of the source dataset above a prescribed minimum number of items and/or a size of the vocabulary above a prescribed minimum number of words.

19 Claims, 11 Drawing Sheets

U.S. PATENT DOCUMENTS

| | | | |
|---|---|---|---|
| 6,760,714 B1* | 7/2004 | Caid et al. | 706/14 |
| 6,813,395 B1* | 11/2004 | Kinjo | 382/305 |
| 6,834,288 B2* | 12/2004 | Chen et al. | 1/1 |
| 6,859,552 B2* | 2/2005 | Izume et al. | 382/170 |
| 6,859,802 B1* | 2/2005 | Rui | 1/1 |
| 6,910,030 B2* | 6/2005 | Choi et al. | 1/1 |
| 7,080,014 B2* | 7/2006 | Bush et al. | 704/275 |
| 7,162,053 B2* | 1/2007 | Camara et al. | 382/100 |
| 7,197,158 B2* | 3/2007 | Camara et al. | 382/100 |
| 7,219,073 B1* | 5/2007 | Taylor et al. | 705/26 |
| 7,257,268 B2* | 8/2007 | Eichhorn et al. | 382/253 |
| 7,460,737 B2* | 12/2008 | Shuster | 382/305 |
| 7,493,340 B2* | 2/2009 | Rui | 1/1 |
| 7,613,686 B2* | 11/2009 | Rui | 1/1 |
| 7,698,332 B2* | 4/2010 | Liu et al. | 707/728 |
| 7,787,711 B2* | 8/2010 | Agam et al. | 382/305 |
| 7,792,887 B1* | 9/2010 | Amirghodsi | 382/165 |
| 7,844,125 B2* | 11/2010 | Eichhorn et al. | 382/253 |
| 8,180,755 B2* | 5/2012 | Dalvi et al. | 707/706 |
| 2002/0184267 A1* | 12/2002 | Nakao | 707/515 |
| 2003/0044062 A1* | 3/2003 | Ganapathy et al. | 382/165 |
| 2004/0170325 A1* | 9/2004 | Eichhorn et al. | 382/205 |
| 2007/0041668 A1* | 2/2007 | Todaka | 382/306 |
| 2007/0258648 A1* | 11/2007 | Perronnin | 382/224 |
| 2008/0205770 A1* | 8/2008 | Jia et al. | 382/217 |
| 2008/0212899 A1* | 9/2008 | Gokturk et al. | 382/305 |
| 2009/0138473 A1* | 5/2009 | Manabe et al. | 707/7 |
| 2009/0234825 A1* | 9/2009 | Xia et al. | 707/4 |
| 2011/0076653 A1* | 3/2011 | Culligan et al. | 434/157 |
| 2011/0258152 A1* | 10/2011 | Wang et al. | 706/12 |
| 2011/0314059 A1* | 12/2011 | Hu | 707/771 |

OTHER PUBLICATIONS

PCT Search Report for Application No. PCT/US2008/055046, mailed Jul. 14, 2008 (11 pages).

* cited by examiner

GENERATING A MULTI-USE VOCABULARY BASED ON IMAGE DATA

This Application claims priority to Provisional Application Ser. No. 60/891,662, filed on Feb. 26, 2007. The Provisional Application is incorporated herein by reference in its entirety.

BACKGROUND

One way of comparing a first image item to a second image item is to compute local features associated with each image item, and then compare the features of the first image item with the features of the second image item. If the first image item includes features that are close to the second image's features, then the first image item likely visually resembles the second image item.

The above approach can be used to retrieve information from a database of image items. In this application, a retrieval system extracts the features of a query image item and then finds the image items in the database that have a similar feature set. One problem with this approach is that it is it consumes a significant amount of time to generate and compare a large quantity of image features. This approach also requires a considerable amount of memory to store the computed features.

One way of addressing the above technical issues is to cluster groups of related features of a source dataset into respective "words," to thereby form a vocabulary. Comparison of a query image item with the source dataset can then be performed on a word-level, rather than a more elementary feature-level. Nevertheless, prior approaches have not adequately explored the vocabulary-generating operation in suitable detail, resulting in potential inefficiencies and limitations in such approaches. For example, prior approaches generate a new vocabulary for each dataset to be searched, and there is a mindset that the vocabulary should be as big as possible.

SUMMARY

Functionality is described for generating a vocabulary from a source dataset of image items or other non-textual items. The vocabulary (and an associated index) serves as a tool for retrieving items from a target dataset in response to queries. The vocabulary can be used to retrieve items from a variety of different target datasets. For instance, the vocabulary can be used to retrieve items from a target dataset that has a different size than the source dataset. The vocabulary can also be used to retrieve items from a target dataset that has a different type than the source dataset. The vocabulary is referred to as a multi-use vocabulary in the sense it can be used in conjunction with other datasets besides the source dataset from which it originated.

In one illustrative case, a multi-use vocabulary is produced from a source dataset having at least an approximate minimum size. In addition, or alternatively, the multi-use vocabulary includes at least an approximate minimum number of words.

Additional exemplary implementations and features are described in the following.

Figure 1:
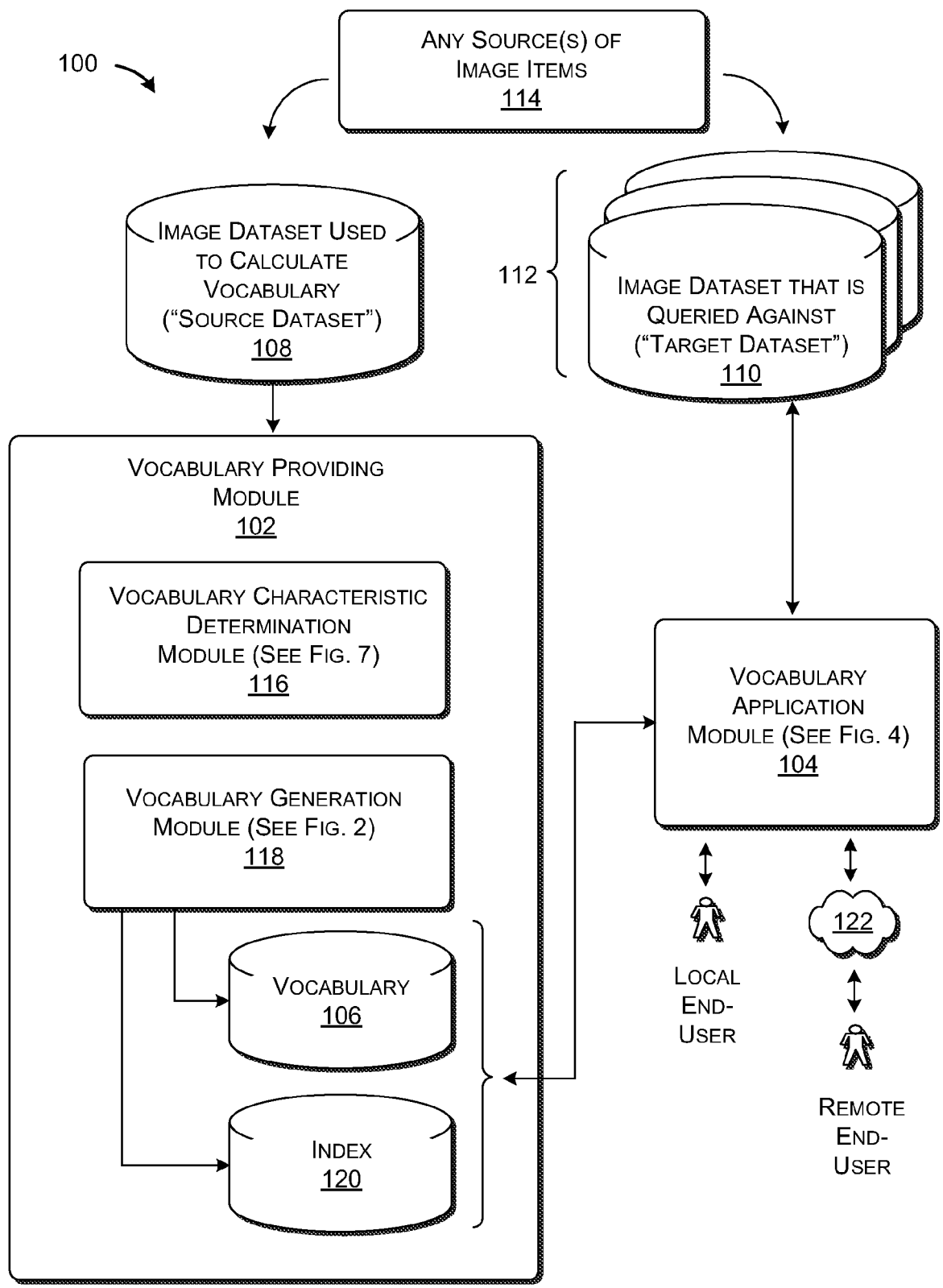
FIG. 1 shows an illustrative system for generating and using a multi-use vocabulary.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an approach for generating and using a multi-use vocabulary based on non-textual data, such as, but not limited to, image data.

As a preliminary note, any of the functions described with reference to the figures can be implemented using software, firmware, hardware (e.g., fixed logic circuitry), manual processing, or a combination of these implementations. The term "logic," "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

Aspects of the functionality are described in flowchart form. In this manner of explanation, certain operations are described as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

This disclosure includes the following sections. Section A describes an illustrative system for generating and using a multi-use vocabulary. Section B describes illustrative procedures that explain the operation of the system of Section A. Section C describes data processing functionality that can be used to implement any aspect of the system of Section A.

A. Illustrative System

FIG. 1 shows an overview of a system 100 generating and using a multi-use vocabulary. The multi-use vocabulary includes words formed from local features. The local features, in turn, are extracted from non-textual data. In the examples which follow, the non-textual data represents image data. However, the systems and procedures describes herein can be applied to other types of non-textual data, such as video data, audio data, and so on. The term "non-textual" means that the data is expressed in a format other than textual characters. (However, it should be noted that image data can include pictures of alphanumeric characters; in this case, the alphanumeric characters are expressed by image data that is interpretable by humans as text, not by textual characters per se).

The system includes two principal components: a vocabulary providing module 102; and a vocabulary application module 104. The purpose of the vocabulary providing module 102 is to generate a vocabulary 106 based on image data obtained from a source dataset 108 of image items. The purpose of vocabulary application module 106 is to apply the vocabulary 106 for a prescribed end use. According to one end use, a user may input a query image item to the vocabulary application module 104. In response, the vocabulary application module 104 can use the vocabulary 106 to determine whether there are any image items in a target dataset 110 that match the query image item.

Before exploring each piece of the system 100 in detail, note that FIG. 1 shows that the vocabulary application module 104 can use a single vocabulary 106 to interact with plural target datasets 112, including representative target dataset 110. One of the target datasets 112 may include the same contents as the source dataset 108. In this case, the vocabulary providing module 112 can form the vocabulary 106 based on the source data set 102 and the vocabulary application module 104 can use the vocabulary 106 to retrieve image items from this same source dataset 108. In other words, the vocabulary is the source dataset's "own" vocabulary.

In another case, one of the target datasets 112 may include a larger collection of image items than is provided in the source dataset 108, stated in other terms, the source dataset 108 may represent a subset of a more encompassing body of image data expressed in a target dataset. For example, one of the target datasets can include a large collection of image items taken of a particular general subject, such as houses within a particular district of a city, whereas the source dataset 108 can comprise a fraction of this large collection of image items. In another case, one of the target datasets 112 may include a smaller collection of image items than is provided in the source dataset 108; stated in other terms, this target dataset may represent a subset of a more encompassing collection of image data expressed in the source dataset 108.

In another case, one of the target datasets 112 may include a collection of image items of a first type and the source dataset 108 can include a collection of image items of a second type, where the first type differs from the second type. For example, one of the target datasets 112 can represent image items taken of houses in a particular city, while the source dataset 108 can represent image items taken of artwork in a museum. These two datasets have different types because the general themes and environments of their corresponding datasets differ. In another case, one of the target datasets 112 can have the same size and type as the source dataset 108, but the target dataset includes a different portion of data than the source dataset 108. For example, the target dataset can represent a first half of a collection of pictures taken of houses in a city, while the source dataset 108 can represent the second half of this collection. Still other kinds of target datasets can make use of the common vocabulary 106. In general, the source dataset 108 and the target datasets 112 can originate from any source (or sources) 114 of data items.

Because the single vocabulary 106 can be used in conjunction with multiple target datasets 112, it is referred to as a multi-use vocabulary. In other words, the vocabulary 106 can be viewed as a universal dataset because it is not restricted for use with the source dataset 108, but can be used in many other types of target datasets 112. To summarize the above explanation, the target datasets 112 can differ from the source dataset 108 in one or more respects. For instance, the target datasets 112 can have different sizes than the source dataset 108, different types than the source data set 108, different selections of same-type data than the source dataset 108, and so on.

With this overview, it is now possible to explore the composition of the vocabulary providing module 102 in greater detail. The vocabulary providing module 102 includes a vocabulary characteristic determination module 116. The purpose of the vocabulary characteristic determination module 116 is to determine one or more characteristics of the vocabulary 106 which allow it to function in the multi-use or universal role described above. For instance, the vocabulary characteristic determination module 116 can determine a minimum approximate size of the source dataset 108 that should be used to provide a vocabulary 106 that can be used for multiple different target datasets 112. In addition, or alternatively, the vocabulary characteristic determination module 116 can determine a minimum approximate number of words that the vocabulary 106 should contain to be used for multiple different target datasets 112. FIGS. 7-17 provide additional information regarding considerations that may play a role in the operation of the vocabulary characteristic determination module 116.

In one case, the vocabulary characteristic determination module 116 operates in a partially automated manner. For example, the vocabulary characteristic determination module 116 can generate various graphs and charts for a human user's consideration. The human user can then analyze this information to determine the nature of the vocabulary 106 that should be generated to ensure multi-use application. In another case, the vocabulary characteristic determination module 116 can operate in a more fully automated manner by automatically determining the characteristics of the vocabulary 106 that should be generated.

Figure 2:
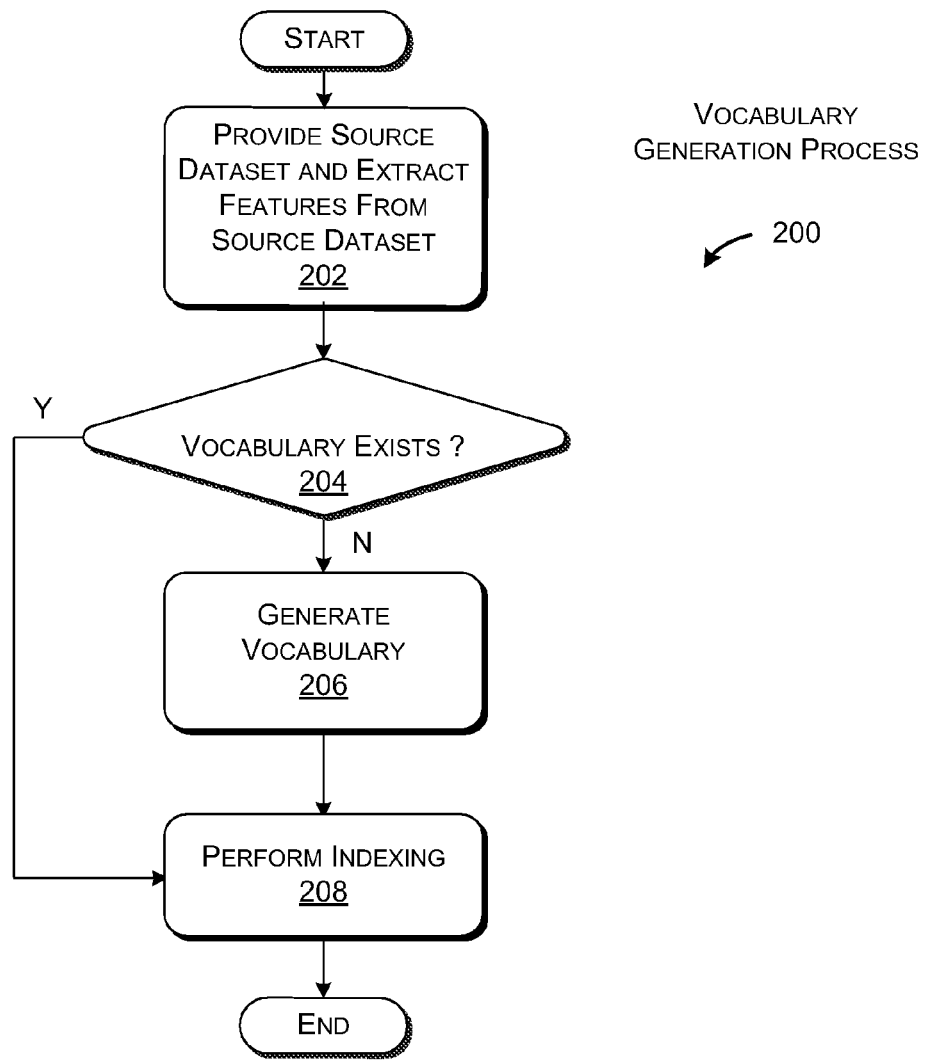
FIG. 2 is a flowchart which shows an illustrative procedure for generating a multi-use vocabulary.
Figure 3:
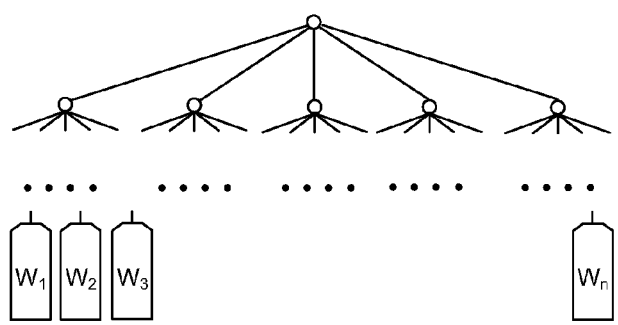
FIG. 3 is a graphical depiction of a hierarchically-formed vocabulary.
Figure 5:
FIG. 5 shows an example of some local features that are extracted from an image item.

The vocabulary providing module 102 also includes a vocabulary generating module 118. The purpose of the vocabulary providing module 102 is to generate the vocabulary 106 from the source dataset 108. The vocabulary generating module 118 generates the vocabulary 106 based on the considerations identified by the vocabulary characteristic determination module 116. FIGS. 2, 3, and 5 provide additional information regarding the generation of the vocabulary 106.

The vocabulary generating module 118 can also provide an index 120. The index can describe the correspondence between words in the vocabulary 106 and words in individual images in a dataset (such as the source dataset 108 and/or one or more of the target datasets 112). The index 120 can be formed using an inverted file approach.

Figure 4:
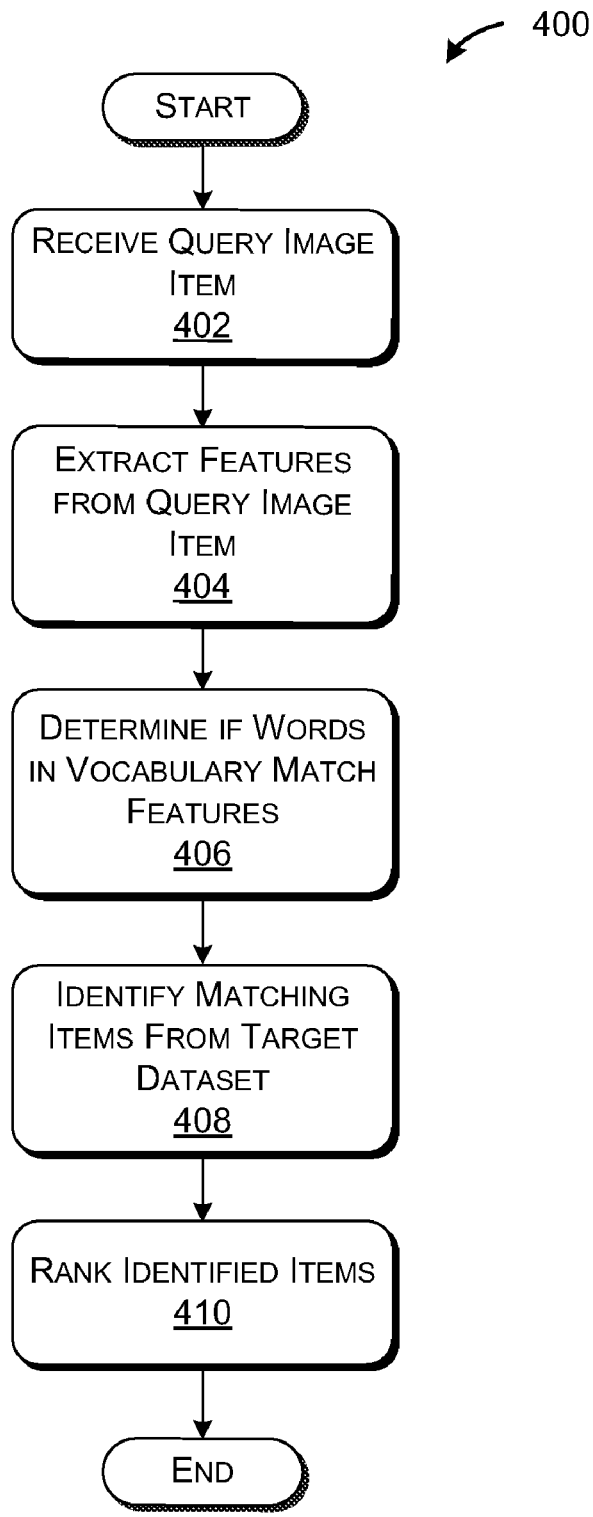
FIG. 4 is a flowchart which shows an illustrative procedure for using a multi-use vocabulary to retrieve image items from a target dataset.
Figure 6:
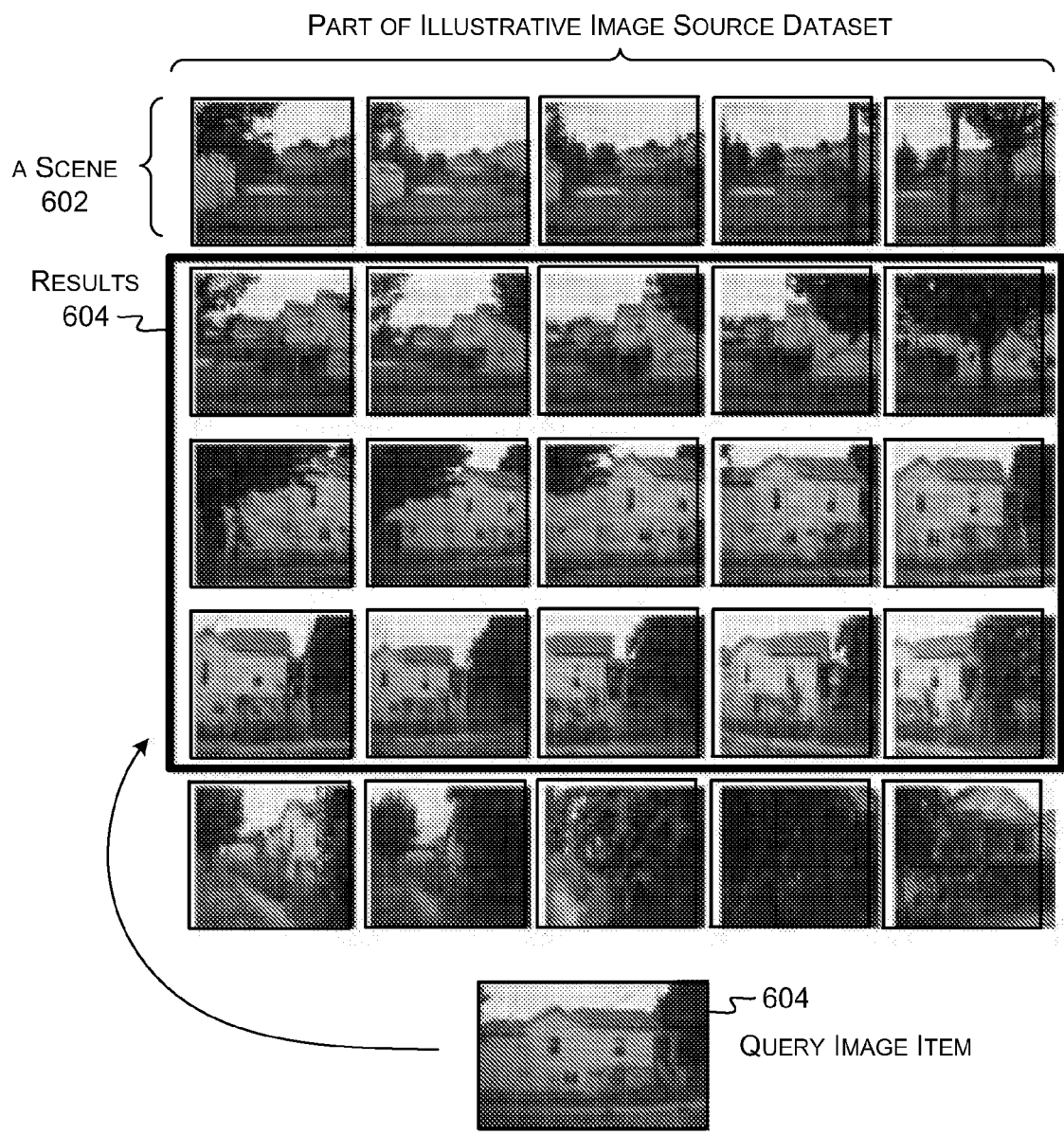
FIG. 6 shows an example of the use of a vocabulary to extract information from a dataset based on the input of a query image item.

Now turning to the vocabulary application module 104, this module 104 accepts a query image item from a user and determines whether this query image item matches one or more image items in a target dataset or target datasets. It performs this task by determining features in the query image item and then determining words associated with those features. It then uses these words, in conjunction with the vocabulary 106 and the index 120, to determine whether any image items in a target dataset include the same or similar image content. FIGS. 4 and 6 provide additional detail regarding the operation of the vocabulary application module 104.

The system 100 can be physically implemented in various ways to suit different technical environments. In one case, the vocabulary providing module 102 and the vocabulary application module 104 can be implemented by a single processing device. For example, the vocabulary providing module 102 and the vocabulary application module 104 can represent two programs or discrete logic components implemented by a single computer device. In another case, the vocabulary providing module 102 and the vocabulary application module 104 can be implemented by two respective data processing devices, such as two respective computer devices. In this case, the first data processing device can provide the vocabulary 106 for use by the second data processing device. In any case, the vocabulary providing module 102 can operate in an offline manner (e.g., as a set-up or initialization task, not driven by user queries), while the vocabulary application module 104 can operation in an online manner (e.g., driven by user queries).

In one case, a user can interact with the vocabulary application module 104 in a local mode of operation. In this case, the user may directly interact with a local data processing device which provides the vocabulary application module 104. In another case, a user can interact with the vocabulary application module 104 in a network-accessible mode of operation. In this case, the user may use a local data processing device (not shown) to interact with a network-accessible vocabulary application module 104 via a network 122. The network 122 can represent a local area network, a wide area network (such as the Internet), or any other type of network or combination thereof.

B. Illustrative Procedures

B.1. Generation of a Vocabulary

FIG. 2 is a flowchart which describes an illustrative procedure 200 for generating the vocabulary 106 from image items in a source dataset 108. In one case, the procedure 200 can operate on image items in units of individual images. An individual image represents a discrete picture taken by a photograph-taking device. In another case, the procedure 200 can operate on image items in units of scenes. A scene represents a general focal point of interest and may include one or more individual images. A scene which includes several instances of an object of interest is the counterpart of a document which includes several instances of a word.

In operation 202, the vocabulary generation module 118 extracts features from the image items in the source dataset 108. Each local feature is represented by a high-dimensional feature vector which describes a local region of a feature point. Different techniques can be used to determine and represent features. In one illustrative and non-limiting approach, operation 202 involves using a Scale Invariant Feature Transform (SIFT) technique in conjunction with a Difference of Gaussian (DoG) detector to extract and represent features. For background information regarding these known techniques, note, for instance: K. Mikolajczyk, et al., "Local Features for Object Class Recognition," Proceedings of the 10$^{th}$ IEEE International Conference on Computer Vision, ICCV, 2005, pp. 1792-1799; and David G. Lowe, "Distinctive Image Features from Scale-Invariant Keypoints," International Journal of Computer Vision, Vol. 60, No. 2, 2004, pp. 91-110.

In operation 204, the vocabulary generation module 118 determines whether a vocabulary already exists. If not, in operation 206, the vocabulary generation module 118 generates the vocabulary 106 for the source dataset 108. The vocabulary generation module 118 forms the vocabulary 106 by grouping common features into respective units called words. In other words, the vocabulary generation module 118 operates by partitioning a feature space created in operation 202 into words.

Different approaches exist for partitioning the feature space. One approach is clustering. In particular, hierarchical clustering can be performed to reduce computation cost. In this approach, operation 206 involves splitting the feature space into to a small number of subsets by clustering, and then splitting the subsets into smaller sets respectively. This process is repeated until one or more conditions are satisfied. Since the vocabulary generated in this way follows a tree structure, the vocabulary represents a vocabulary tree.

Generally, there are two types of condition for use in terminating a clustering operation: a tree depth condition; and a leaf size condition. The term tree depth refers to a number of levels of the vocabulary tree. The term leaf size refers to a feature number in a leaf node of the vocabulary tree. A vocabulary tree built by satisfying a depth condition is referred to herein as a "D-tree," while a vocabulary tree build by satisfying a leaf size condition is referred to as an "L-tree." For example, a "D-8" tree refers to a tree in which splitting terminates when the tree reaches the eighth level. An "L-100" tree refers to a tree in which splitting terminates when the feature number of a cluster is less than 100. These two methodologies reflect different conceptualizations of feature space partitioning. D-tree clustering generates words of similar feature space size, but may produce results having a different number of features. L-tree clustering generates words that cover a similar number of features, but may produce results having different feature space sizes.

In one illustrative and non-limiting implementation, operation 206 can use a Growing Cell Structures (GCS) algorithm to split features into five subsets. Background information on the GCS technique is provided in B. Fritzke, "Growing Cell Structures—A Self-Organizing Network in k Dimensions," Artificial Neural Networks II, I. Aleksander & J. Taylor, eds., North-Holland, Amsterdam, 1992, pp. 1051-1056. FIG. 3 generally represents the clustering of a feature space using this technique. The leaf nodes represent words for inclusion in the vocabulary 106.

In operation 206, the vocabulary generation module 118 also creates the index 120 for the vocabulary 106. The index 120 provides a document list for each word. The list identifies scenes which contain the features that belong to the word. The index 120 thus forms an inverted file for the words in the vocabulary 106. If an image vocabulary already exists (as determined in operation 204), then operation 208 involves inserting the features of the dataset 108 into the existing vocabulary tree to form a new inverted file. Operation 208 can also involve forming aggregative results, such as an indication of the frequency of each word within a scene, the frequency of each word within a dataset, and so forth.

B.2. Application of the Vocabulary

There are several uses of the vocabulary formed in the procedure 200 of FIG. 2. FIG. 4 is a flowchart that shows a procedure 400 for applying the vocabulary to retrieve information from a target dataset in response to the input of a query image item. The target dataset may be the same as the source dataset 108 or may be different from the source dataset 108.

In operation 402, the vocabulary application module 104 receives a query in the form of a query input image. A user enters this query input image with the goal of finding one or more image items in the target dataset which are the same as or which closely resemble the query input image. In a more particular case, the goal may be to find one or more image items which include an object which closely resembles an object of interest in the query input image.

In operation 404, the vocabulary application module 104 extracts features from the query image item in the same manner described above with respect to items in the source dataset 108.

In operation 406, the vocabulary application module 104 determines whether any words in the vocabulary 106 correspond to the features extracted from the query image item.

In operation 408, the vocabulary application module 104 identifies items in the target dataset which are associated with any matching words identified in operation 406.

In operation 410, the vocabulary application module 104 ranks the items identified in operation 408 in order of relevance. Operation 410 then involves outputting the ranked list of relevant items to the user for his or her consideration.

Different techniques can be used to assess relevance. According to one technique, given an image vocabulary, a query image q or a database document (scene) d can be represented as an N dimensional vector of words which correspond to the local features extracted from them. Each word has a weight associated with it. N is the number of words in the vocabulary (which is the same as the dimension of the query or document vector). The relevance between q and d can be calculated as the cosine of the angle between the two word vectors. That is:

$$r(d, q) = \frac{\sum_{i=1}^{N} w_{di} w_{qi}}{\|d\| \|q\|},$$

where $w_{di}$ is the weight of the $i^{th}$ word in document d, $w_{qi}$ is the weight for the word in query q. The denominator in this equation represents the norm of the document or query vector.

The weight of each word may take two factors into consideration: term frequency (TF) and inverse document frequency (IDF). Term frequency refers to the normalized frequency of a word in a document. In the present case, large term frequency means that the word appears multiple times in the same scene, which indicates that the feature is more robust. Therefore, such features can be given higher weight. TF may be calculated as:

$$TF(t_i, d) = \frac{|d|}{\sum_{k=1}^{N_d} n_k},$$

where $n_i$ is the number of occurrences of term $t_i$ in document d, and $N_d$ is the number of words in document d.

The motivation for using inverse document frequency is that terms which appear in many documents are not very useful for distinguishing a relevant document from a non-relevant one. In the present case, very common terms may correspond to noisy features. IDF can be calculated as:

$$IDF(t_i) = \log \frac{|D|}{|\{d \mid t_i \in d\}|},$$

where |D| is the total number of documents in the database, and $|\{d|t_i \epsilon\}|$ is the number of documents in which $t_i$ appears. In text retrieval, if a word appears in too many documents, that is, if IDF is small, the word will be ignored in word matching since it contributes little while introducing too much noise. Such words are called "stop words." By deleting stop words from the index, both memory cost and retrieval time can be reduced. In image retrieval, analogously, a leaf on the vocabulary tree can be defined as a stop word if it appears in too many scenes.

Finally the weight for word $t_i$ in document d is defined as the multiplication of TF and IDF:

$$w_{di} = TF(t_i, d) IDF(t_i)$$

The weight of the query is calculated using the same function, considering the query as a document.

FIG. 5 shows an individual image item in the source dataset 108. The circles in the figure represent features that match a query image item. Groups of features are associated with respective words. In the manner indicated above, comparison between image items in a target dataset and an input query image item takes place on a word-level rather than a feature-level.

FIG. 6 shows part of a target dataset. The images in this target dataset are taken of houses in a city. The images are arranged in the temporal sequence in which the pictures were taken. Each row in this figure represents a scene. For example, the first row 602 represents a scene. The user has input a query image item 604. The vocabulary application module has determined that the three scenes in the middle 606 match the query image item 604.

B. 3. Selecting Characteristics of a Desirable Vocabulary

Figure 7:
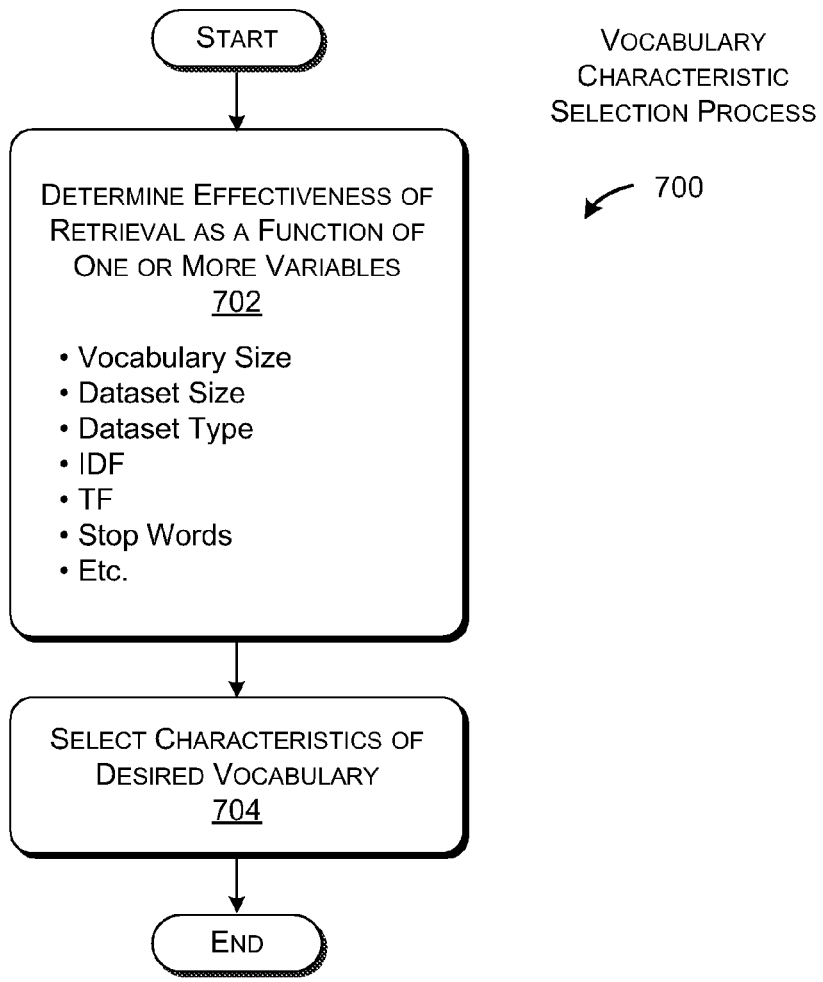
FIG. 7 is a flowchart which shows an illustrative procedure for selecting characteristics of a desired vocabulary.

FIG. 7 is a flowchart which shows a procedure 700 for selecting characteristics of a desirable vocabulary. A desirable vocabulary in this context refers to a multi-use vocabulary, meaning a vocabulary that can be used as a tool to interact with multiple target datasets.

In operation 702, the vocabulary characteristic determination module 116 determines retrieval performance. Retrieval performance can be measured in various ways. In one type of technique, a Success Rate at N (SR@N) measure can be used to represent the success of a retrieval operation. Namely, SR@N represents the probability of finding a correct answer within N top results. Given n queries, SR@N is defined as $$SR@N = \frac{\sum_{q=1}^{n} \theta(N - pos(a_q))}{n},$$

where $pos(a_q)$ is the position of the correct answer $a_q$ for the $q^{th}$ query, $\theta( )$ is a Heaviside function defined by $\theta(x)=1$, if $x \geq 0$, and $\theta(x)=0$ otherwise. Generally, SR@N increases rapidly when N is small (e.g., smaller than five), and then increases at a slower rate for larger values of N. In the following, the success rate for N=1 is used to measure performance; this metric is generally representative of the performance for other values of N.

To provide more insightful results, the retrieval performance can also be measured for multiple different clustering approaches. For example, retrieval performance can be determined for a D-tree clustering approach and an L-tree clustering approach. Retrieval performance can be assessed for yet additional types of clustering approaches. Moreover, results of several tests can be averaged together to provide more reliable results.

Figure 8:
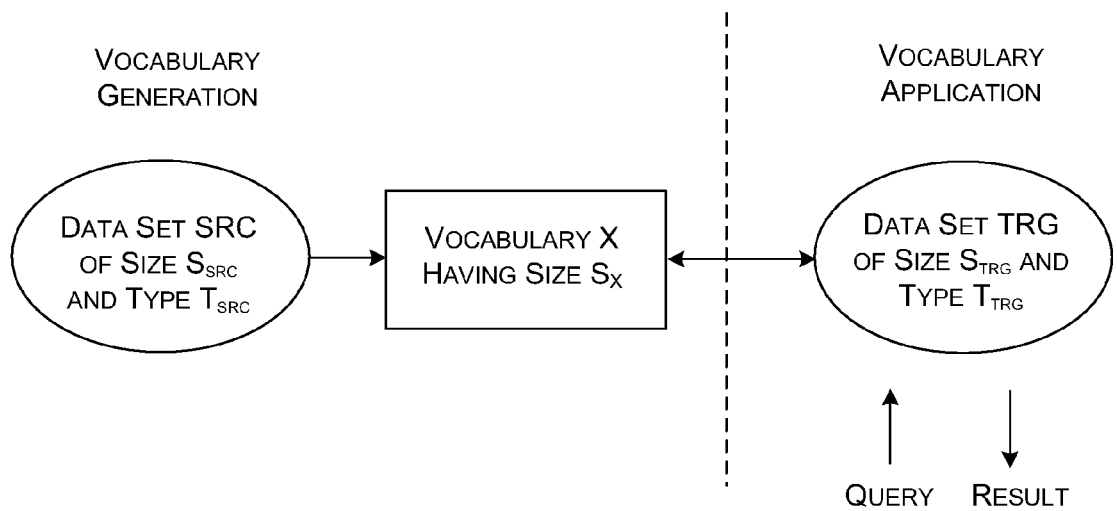
FIG. 8 is a graphical depiction of characteristics which may be relevant to the selection of a desired vocabulary.

Operation 702 indicates that retrieval performance can be assessed against various considerations. One such consideration is the size of the vocabulary that is generated. Another consideration is the size of the source dataset used to generate the vocabulary. Another consideration is the type of the source dataset 108 in relation to the type of the target dataset. FIG. 8 illustrates these variables in graphical form. The variables include the size and type of the source dataset, the size and type of the target dataset, and the size of the vocabulary. Other factors include various relevance considerations, such as the use of IDF, TF, stop words, and so forth (as described above).

Operation 702 can assess the retrieval performance as a function of each of the above considerations, that is, by isolating each consideration in turn. A human user or an automated analysis routine (or a semi-automated analysis routine) can then consider all of the results together to determine what factors play a role in producing a multi-use vocabulary. Namely, one goal is to determine the characteristics of a vocabulary that can be used in conjunction with multiple target datasets. Another goal is to ensure that the vocabulary is not unnecessarily large or complex. An unnecessarily large or complex vocabulary may be costly to generate and maintain, even though it may also qualify as a multi-use vocabulary. In view of these factors, the general goal is to provide an optimal vocabulary or an approximately optimal vocabulary.

Figure 9:
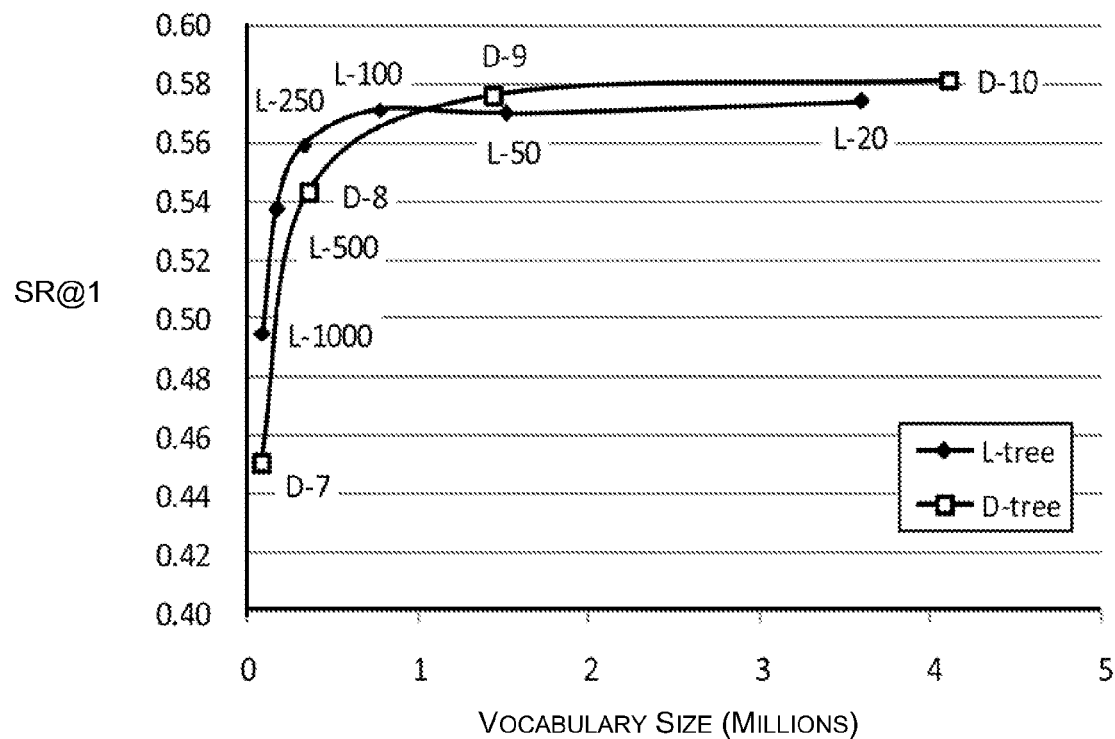
FIGS. 9-17 show illustrative graphs and charts which can be used as guidance in selecting characteristics of a desired vocabulary.

Consider first the consideration of vocabulary size. FIG. 9 shows retrieval performance (SR@1) relative to vocabulary size (in units of millions). In this case, 100,000 image items where used to compute vocabularies of different sizes. FIG. 9 presents results for two clustering methods, an L-tree approach and a D-tree approach. It can be observed that, for both curves, performance rises rapidly at first and then levels off. More specifically, the curves begin to level off at about half a million words in the vocabulary. This graph indicates that there is an optimal vocabulary size to reach the balance of performance and memory cost. In one particular study, for 100,000 image items in a source dataset 108, which contain about 30 million features, the optimal vocabulary size is approximately 0.4 million.

Figure 10:
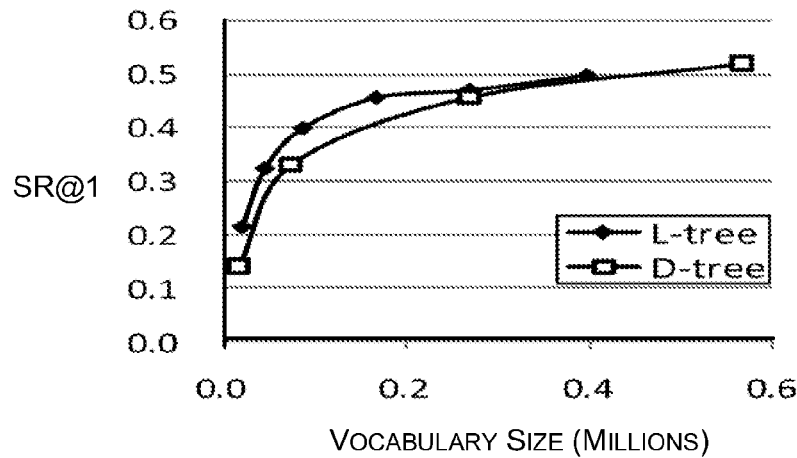

FIG. 10 shows the results of the same study performed for FIG. 9, but in this case, instead of using 100,000 image items in the source dataset 108, 10,000 image items are used in the source dataset 108. As indicated in this figure, the SR@1 curves again rise sharply when the vocabulary size is small. There is a noted slowing of success rate as the size of vocabulary increases; however, the curves do not have a flat part that is as pronounced as that shown in FIG. 9. From these results, it may be concluded that small datasets can produce effective vocabularies if the size of those vocabularies is suitably increased, but due to the lack of features, small datasets may have difficulty providing a sufficient amount of words to reach optimal results. Further note that the L-tree curve reflects a slightly better performance than the D-tree approach.

Figure 11:
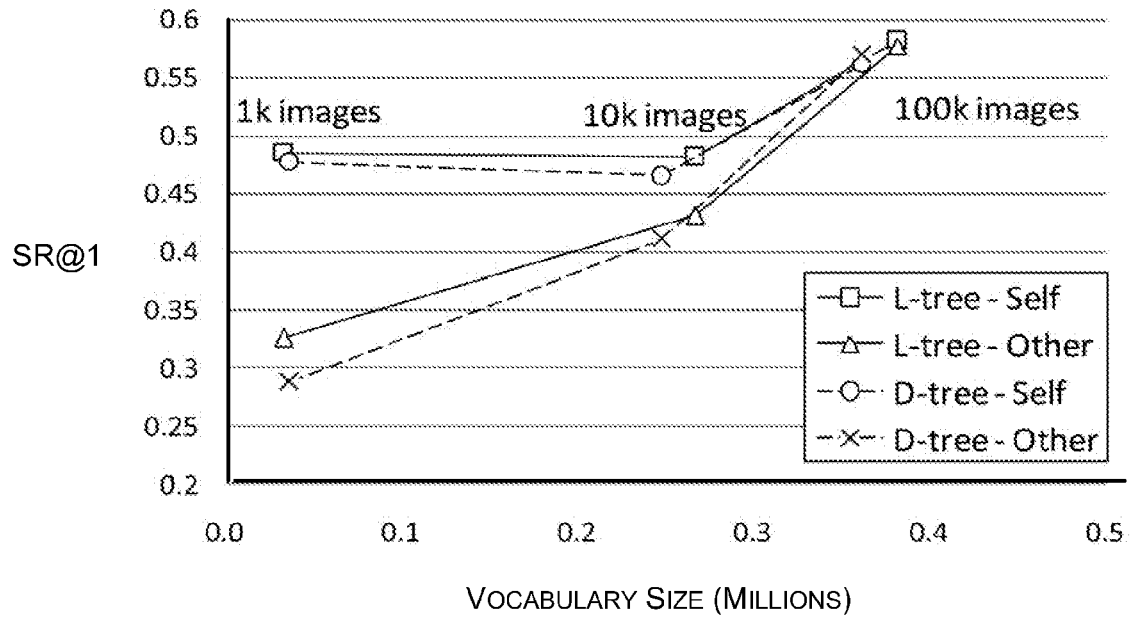

FIG. 11 shows a study in which multiple source datasets are formed, e.g., multiple source datasets each having 1000 image items, multiple source datasets each having 10,000 image items, and multiple source datasets multiple each having 100,000 image items. Vocabularies are generated for each of these source datasets. Then, the retrieval performance of these vocabularies is tested. A "self"-type test means that a vocabulary generated for a particular dataset is applied to retrieve image items from that dataset. An "other"—type test means that the vocabulary generated for a particular source dataset is applied to retrieve image items from a "peer" dataset. For example, an "other"—type test can be performed by generating a vocabulary using one or more versions of a 10,000 dataset, and then using this vocabulary as a tool to retrieve image items from one or more other 10,000 datasets that did not play a part in the generation of the vocabulary. Here, note that comparisons are being made for same-scale datasets (e.g., a 1,000 dataset is compared with another 1,000 dataset, while a 10,000 dataset is compared with another 10,000 dataset, and so on).

Figure 12:
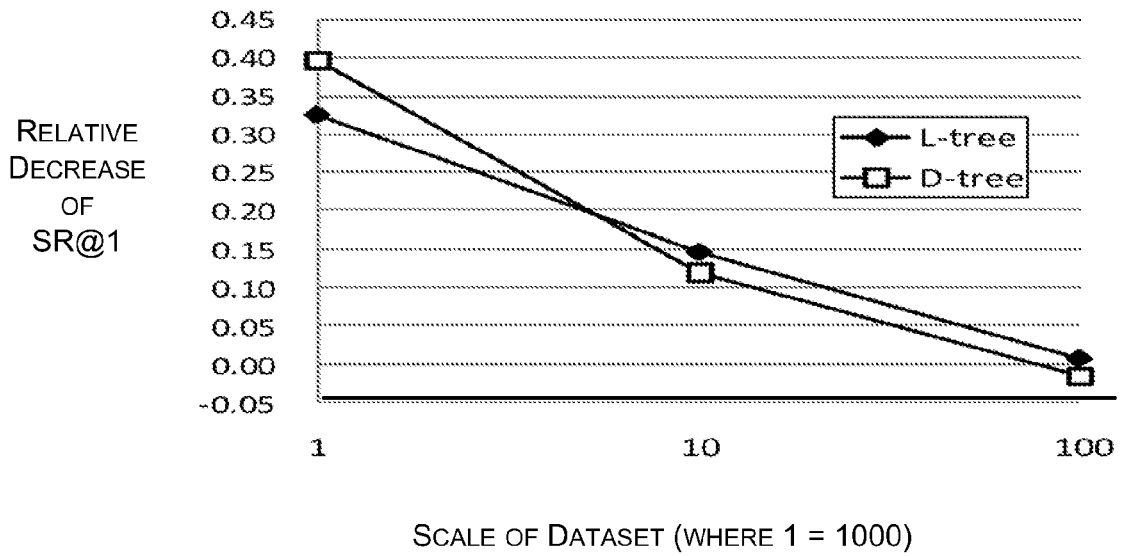

As indicated in FIG. 11, for both L-tree and D-tree clustering methods, there is a marked difference between the self-test and other-test for datasets of 1,000; namely, the performance for the self-test is much better than the performance of the other-test. The difference between the self-test and other-test is still significant for datasets of 10,000, but less than the case of 1,000. The difference between the self-test and other-test is relatively small for datasets of 100,000. FIG. 12 shows these results in a different way, e.g., by plotting relative decrease in performance verses scale of the source dataset. Note that the relative difference decreases to about zero at approximately a dataset size of 100,000.

Figure 13:
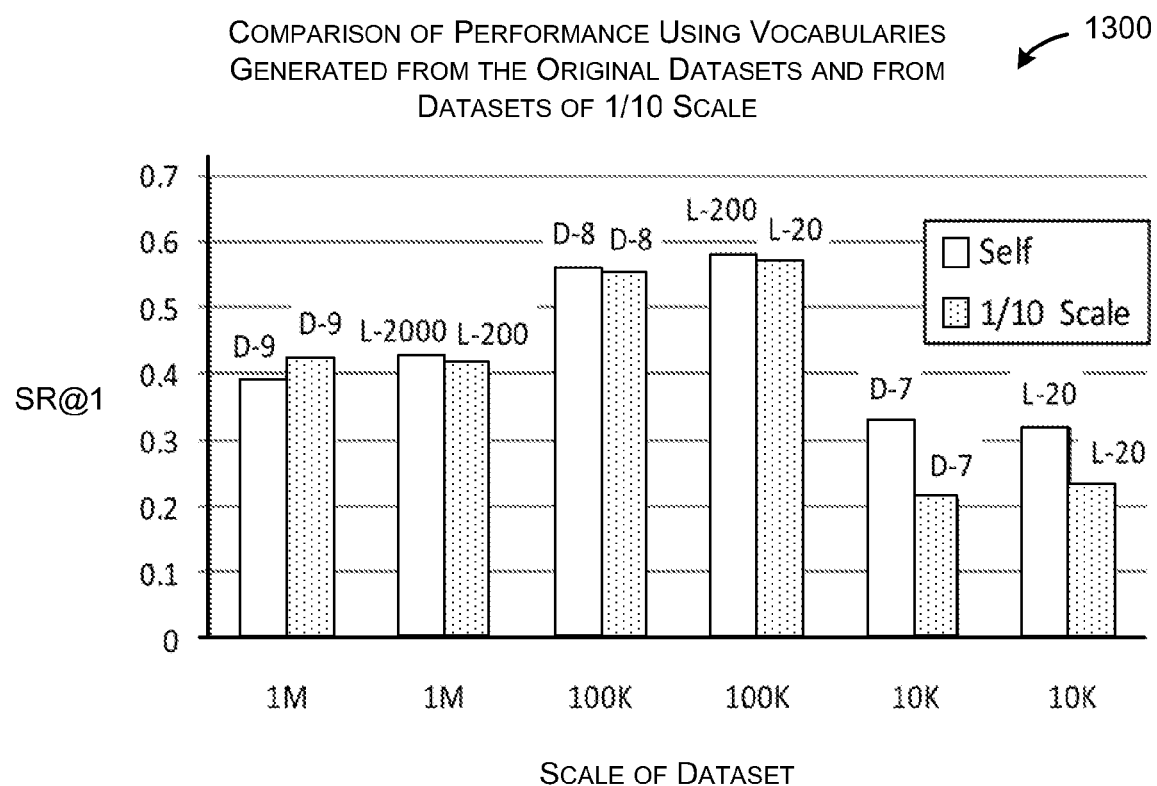

FIG. 13 explores the use of vocabularies generated using source datasets of a first size to retrieve image items from datasets of a second size, where the second size is larger than the first size. For example, a vocabulary generated using a source dataset of 10,000 image items can be used to retrieve image items from a target data set having 100,000 image items. This requires that the vocabulary generated using the smaller source dataset is used to index the 100,000 target dataset. As shown in FIG. 13, when the target dataset scale is 10K, using a vocabulary generated on a source dataset of 1/10 scale will lead to a significant decrease of SR@1. When the target dataset is 100,000, using a source dataset of 1/10 scale will lead to smaller decrease in SR@1. When the target dataset scale is 1,000,000, SR@1 may increase for some clustering methods. These results imply that vocabularies can be used to retrieve images from larger target datasets if the source dataset used to generate the vocabularies is large enough, for example, at least approximately 100,000.

Note that on a scale of 1,000,000, the D-9 tree and the L-2000 tree yield similar performance, but the vocabulary size of the D-9 tree is 4 million while vocabulary size of the L-2000 tree is 0.4 million. This verifies the earlier conclusion that approximately half a million words is a suitable vocabulary size. The reason for the increase of SR@1 on 1,000,000 images might be that there are too many features and some of the features introduce noise, causing the vocabulary quality to get worse.

Figure 14:
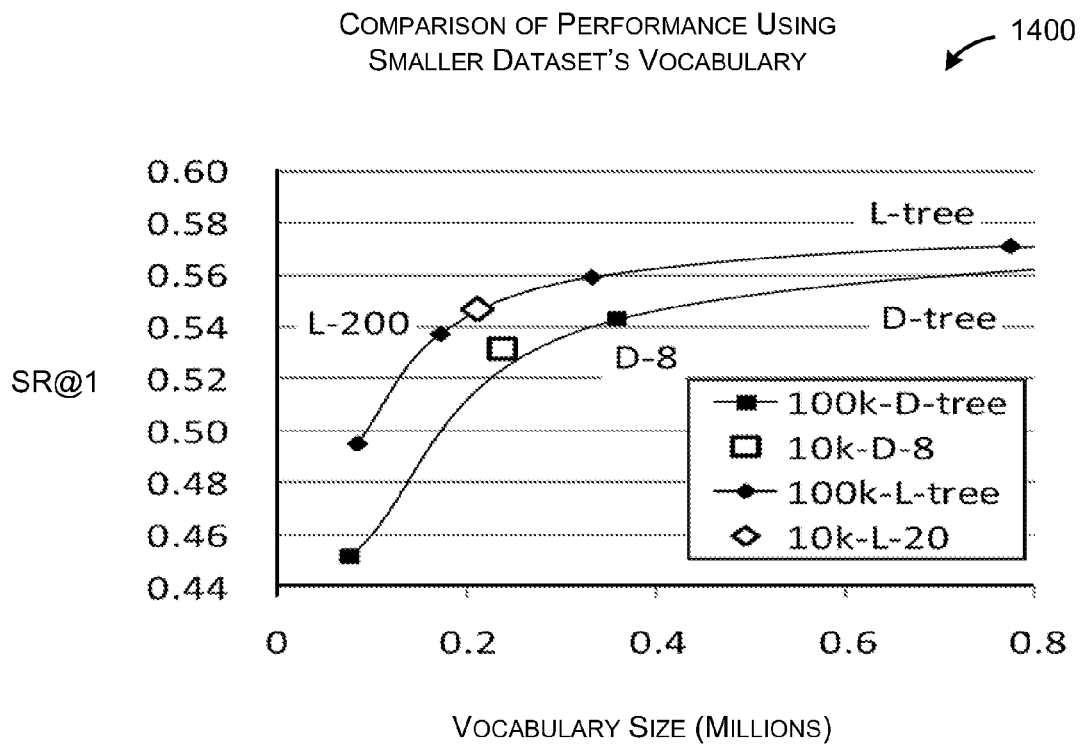
Figure 15:
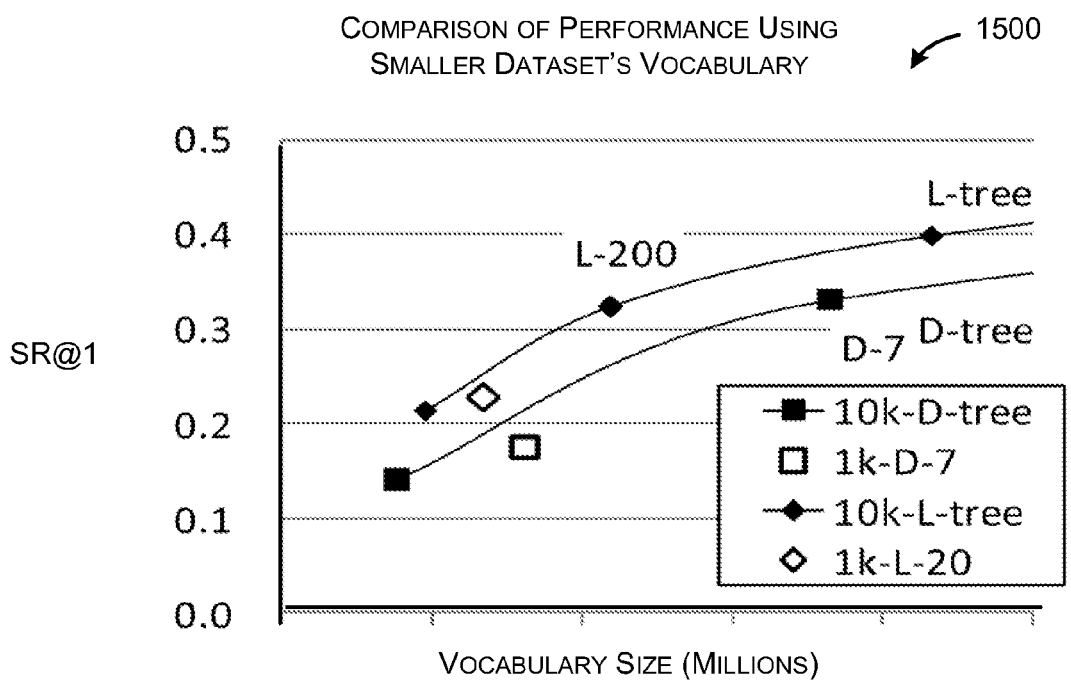

There are two factors that affect the accuracy: vocabulary size and vocabulary quality. Vocabulary quality refers to the extent that a vocabulary effectively reflects the distribution of a feature space. As discussed above in connection with FIG. 9, vocabulary size has a significant impact on performance. In order to separate the impact of vocabulary size from the impact of vocabulary quality, FIGS. 14 and 15 compare SR@1 using smaller datasets' vocabularies with the datasets' own SR@1-vocabulary size curves. For a dataset size of 100,000 (as indicated in FIG. 14), using a vocabulary generated from a dataset of 10,000 results in a SR@1 that is slightly above the curve. For a dataset size of 10,000 (as indicated in FIG. 15), using a vocabulary generated from a dataset of 1,000 results in a SR@1 that is slightly below the curve. These results indicate that, as the dataset becomes larger, vocabulary quality becomes better. This is because a large dataset provides sufficient features to generate a suitable vocabulary that can reflect the distribution well. But if the number of features becomes too big, as for the case of 1,000,000 image items, vocabulary quality may be negatively influenced by noise.

Figure 16:
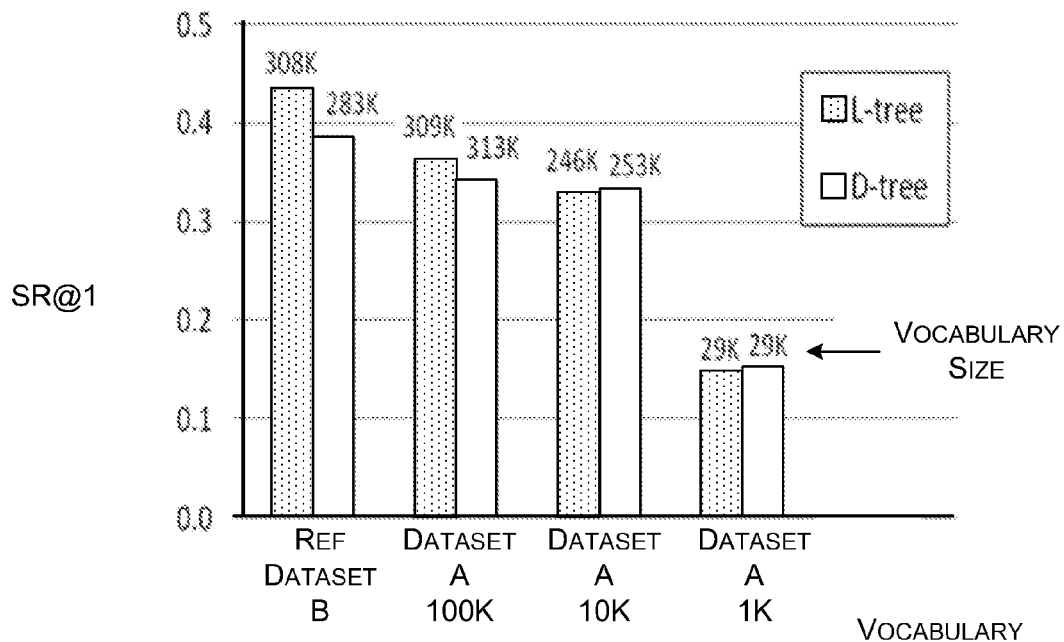
Figure 17:
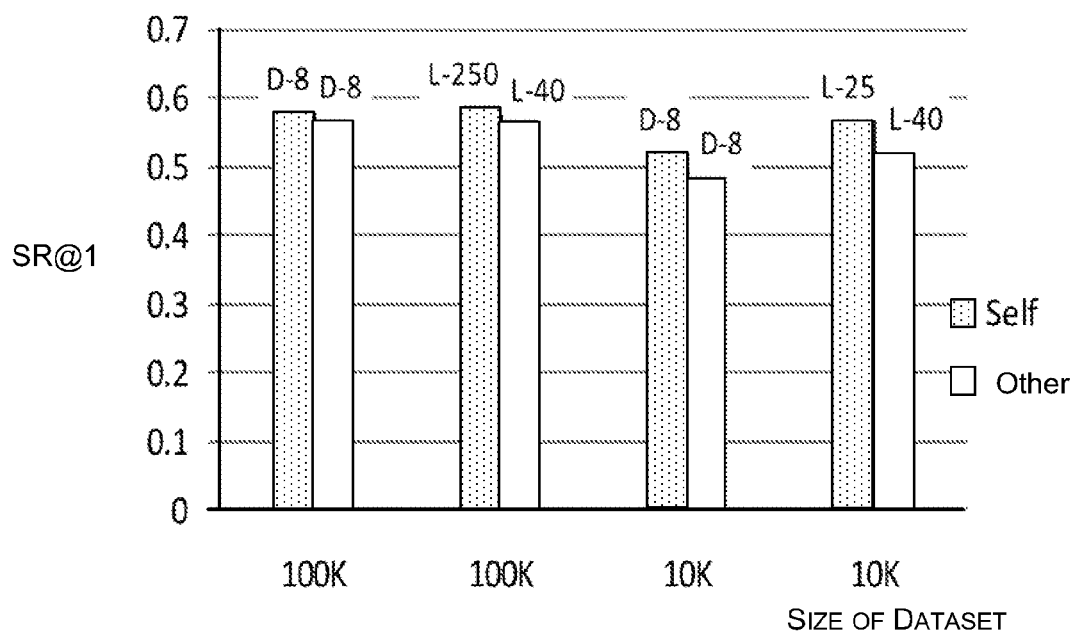

FIGS. 16 and 17 shows the effects of using a vocabulary generated using a first type of image data as a tool to retrieve images associated with a second type of image data. For instance, in the example cited above, a source dataset of type A that represents pictures taken of houses in a particular part of a city can be used to generate a vocabulary. This vocabulary can then be tested as a tool for retrieving images associated with a different type of dataset of type B, such as pictures of artwork in a museum, and so on. More generally, different types of image data correspond to image data that describes different types of objects of interest in different respective environments.

FIG. 16 shows the results of applying vocabularies generated from different-sized source datasets of a first type (type A) to retrieve image items from a target dataset of a second type (type B). FIG. 16 also shows, for reference purposes, the results of a vocabulary generated from the dataset of the second type (type B) to retrieve image items from that same dataset. Note that the use of type-A-generated vocabularies as applied to the type-B datasets produces varying degrees of success. The success increases as a function of the size of the source dataset and the size of the vocabularies generated therefrom.

FIG. 17 shows another study in which a vocabulary produced by a dataset of type B image items is used to retrieve image items from datasets of type A images. When the source dataset scale is 100,000 and 10,000, the decrease of SR@1 is relatively small, and the decrease is smaller on 100,000 datasets than on 10,000 datasets. This result again demonstrates that if the size of the result dataset is large enough, for example 100,000, and the size of vocabulary is sufficient, such as 300,000, the performance of the vocabulary will not significantly drop due to a change of data type.

Consider the case in which the image items of type A are more general (producing more variation) than the image items of type B. Comparing FIG. 16 and FIG. 17, it may be observed that a target dataset that is general in nature is more robust to a change in vocabulary compared to a target dataset of a more specific nature.

Returning finally to FIG. 7, in operation 704, an analysis is performed of all of the results indicated above to select a vocabulary that is suitable for multiple uses, e.g., which can be used for target datasets of larger sizes and/or target datasets of different types. In one illustrative application, operation 704 makes a conclusion that a source dataset of approximately 100,000 image items and a vocabulary size of approximately 500,000 words is sufficient to achieve a multi-use vocabulary. Moreover, operation 704 can conclude that vocabularies formed from larger datasets (and/or larger vocabularies) may not yield markedly better results, and, in fact, may produce inferior results due to noise-related considerations.

The approximate values of 100,000 and 500,000 are representative of one particular scenario associated with one particular environment. Other vocabulary characteristics may be appropriate for different respective scenarios and environments. In general, for instance, a source dataset size can be selected to correspond to an approximate transition point at which further increases in size do not yield significant increases in performance, relative to increases in size prior to the transition point. A vocabulary size can be selected to correspond to an approximate transition point at which further increases in word number do not yield significant increases in performance, relative to increases in number prior to the transition point. These transitions points generally correspond to the leveling-off (or elbow) points in the performance vs. size graphs described herein.

Although not described herein, it is found that term-weighting considerations (such as the use of TF, IDF, and stop word considerations) may improve retrieval performance in some scenarios, but these improvements are not great. Thus, these term-weighting considerations can optionally be omitted in certain cases. Omitting these considerations will reduce the complexity of the calculations and will reduce the time-related and memory-related costs associated therewith.

C. Illustrative Data Processing Functionality

Figure 18:
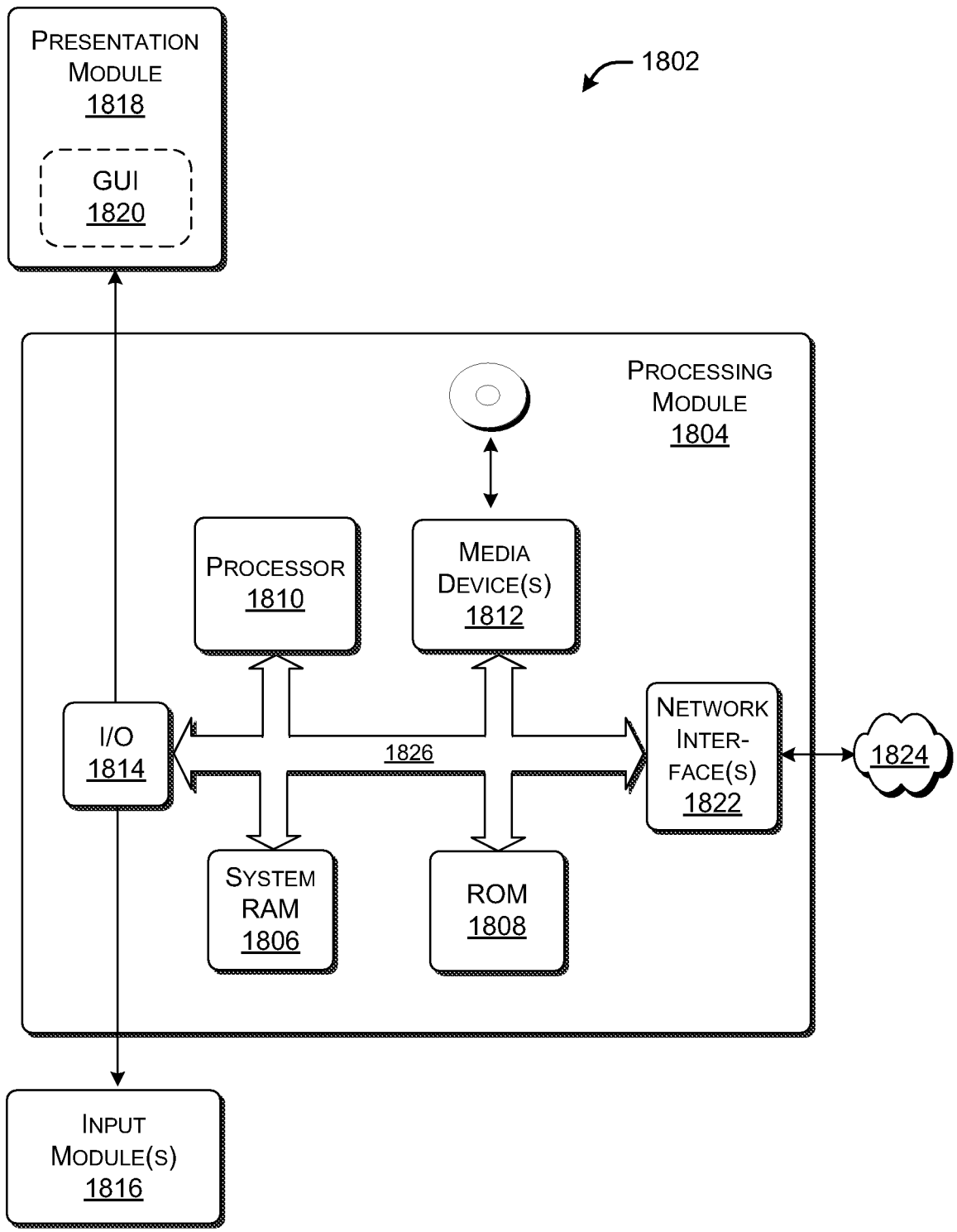
FIG. 18 shows illustrative processing functionality that can be used to implement any aspect of the system of FIG. 1.

FIG. 18 sets forth illustrative processing functionality 1802 that can be used to implement any aspect of system 100 shown in FIG. 1. In one non-limiting case, for instance, the processing functionality 1802 may represent any computer machine used by the system 100, e.g., to implement any aspect the vocabulary providing module 102 and/or any aspect of the vocabulary application module 104, and/or any aspect of a user device (not shown) used to interact with the vocabulary application module 104, and so forth.

The processing functionality 1802 can include a processing module 1804 for implementing various processing functions. The processing module 1804 can include volatile and non-volatile memory, such as RAM 1806 and ROM 1808, as well as one or more processors 1810. The processing functionality 1802 can perform various operations identified above when the processor(s) 1810 executes instructions that are maintained by memory (e.g., 1806, 1808, or elsewhere). The processing functionality 1802 also optionally includes various media devices 1812, such as a hard disk module, an optical disk module, and so forth.

The processing functionality 1802 also includes an input/output module 1814 for receiving various inputs from the user (via input modules 1816), and for providing various outputs to the user (via output modules). One particular output mechanism may include a presentation module 1818 and an associated graphical user interface (GUI) 1820. The processing functionality 1802 can also include one or more network interfaces 1822 for exchanging data with other devices via one or more communication conduits 1824. One or more communication buses 1826 communicatively couple the above-described components together.

In closing, a number of features were described herein by first identifying illustrative problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as illustrative forms of implementing the claimed invention.

What is claimed is:

1. A method for generating a vocabulary for non-textual items, comprising:
   under control of one or more processors configured with executable instructions:
   providing a source dataset of a first type comprising a plurality of items of the first type;
   identifying features in the source dataset; and
   generating a plurality of words associated with the features to form a single vocabulary, the single vocabulary serving as a mechanism for use in retrieving items from plural different target datasets of different types in response to queries made to the plural different target datasets, wherein:
      the different types comprise different themes or scenes,
      each word of the plurality of words is associated with a weight with respect to a particular document, the weight being determined based on multiplying a term frequency (TF) of the word with an inverse document frequency (IDF) of the word,
      the term frequency of each word with respect to the particular document comprises a normalized frequency of the word in the particular document,
      the inverse document frequency of each word determines whether the word is useful for distinguishing a relevant document from an irrelevant document based on how frequently the word appears in a plurality of documents, and
      the inverse document frequency of each word is determined based on a logarithmic function of a ratio between a total number of documents in a database and a total number of documents in which the word appears.

2. The method of claim 1, wherein the non-textual items comprise image items.

3. The method of claim 1, wherein the source dataset has at least a predetermined size to ensure that the single vocabulary serves as the mechanism for use in retrieving the items of the types different from the first type from the plural different target datasets of the different types.

4. The method of claim 3, wherein the predetermined size corresponds to an approximate transition point at which further increases in size do not yield significant increases in performance, relative to increases in size prior to the transition point, wherein the single vocabulary is generated using a source dataset having approximately the predetermined size.

5. The method of claim 1, wherein the single vocabulary has at least a predetermined number of words to ensure that the single vocabulary serves as the mechanism for use in retrieving the items of the types different from the first type from the plural different target datasets of the different types.

6. The method of claim 5, wherein the predetermined number corresponds to an approximate transition point at which further increases in number do not yield significant increases in performance, relative to increases in number prior to the transition point, wherein the single vocabulary is generated to have approximately the predetermined number.

7. The method of claim 1, wherein at least one of the plural different target datasets has a size larger than a size of the source dataset.

8. The method of claim 1, wherein the single vocabulary is further configured to serve as a mechanism for use in retrieving the items from the source dataset in response to queries made to the source dataset.

9. The method of claim 4, wherein the transition point includes a leveling-off point in a performance vs. size graph.

10. One or more memory devices configured with computer-executable instructions that, when executed by one or more processors, configure the one or more processors to perform acts comprising:
    providing a source dataset of a first type comprising a plurality of items of the first type;
    identifying features of the first type in the source dataset; and
    generating a plurality of words associated with the features to form a single vocabulary, the single vocabulary serving as a mechanism for use in retrieving items from plural different target datasets of different types in response to queries made to the plural different target datasets, wherein:
       the different types comprise different themes or scenes,
       each word of the plurality of words is associated with a weight with respect to a particular document, the weight being determined based on multiplying a term frequency (TF) of the word with an inverse document frequency (IDF) of the word,
       the term frequency of each word with respect to the particular document comprises a normalized frequency of the word in the particular document,
       the inverse document frequency of each word determines whether the word is useful for distinguishing a relevant document from an irrelevant document based on how frequent the word appears in a plurality of documents, and
       the inverse document frequency of each word is determined based on a logarithmic function of a ratio between a total number of documents in a database and a total number of documents in which the word appears.

11. The one or more memory devices of claim 10, wherein the non-textual items comprise image items.

12. The one or more memory devices of claim 10, wherein the source dataset has at least a predetermined size to ensure that the single vocabulary serves as the mechanism for use in retrieving the items of the types different from the first type from the plural different target datasets of the different types.

13. The one or more memory devices of claim 12, wherein the predetermined size corresponds to an approximate transition point at which further increases in size do not yield significant increases in performance, relative to increases in size prior to the transition point, wherein the single vocabulary is generated using a source dataset having approximately the predetermined size.

14. The one or more memory devices of claim 13, wherein the transition point includes a leveling-off point in a performance vs. size graph.

15. The one or more memory devices of claim 10, wherein the single vocabulary has at least a predetermined number of words to ensure that the single vocabulary serves as the mechanism for use in retrieving the items of the types different from the first type from the plural different target datasets of the different types.

16. The one or more memory devices of claim 15, wherein the predetermined number corresponds to an approximate transition point at which further increases in number do not yield significant increases in performance, relative to increases in number prior to the transition point, wherein the single vocabulary is generated to have approximately the predetermined number.

17. The one or more memory devices of claim 10, wherein at least one of the plural different target datasets has a size larger than a size of the source dataset.

18. The one or more memory devices of claim 10, wherein the single vocabulary is further configured to serve as a mechanism for use in retrieving the items from the source dataset in response to queries made to the source dataset.

19. One or more computing devices, comprising:
one or more processors; and
memory to store computer-executable instructions that, when executed by the one or more processors, perform acts comprising:
providing a source dataset of a first type comprising a plurality of items of the first type;
identifying features in the source dataset; and
generating a plurality of words associated with the features to form a single vocabulary, the single vocabulary serving as a mechanism for use in retrieving items from plural different target datasets of different types in response to queries made to the plural different target datasets, wherein:
the different types comprise different themes or scenes,
each word of the plurality of words is associated with a weight with respect to a particular document, the weight being determined based on multiplying a term frequency (TF) of the word with an inverse document frequency (IDF) of the word,
the term frequency of each word with respect to the particular document comprises a normalized frequency of the word in the particular document,
the inverse document frequency of each word determines whether the word is useful for distinguishing a relevant document from an irrelevant document based on how frequent the word appears in a plurality of documents, and
the inverse document frequency of each word is determined based on a logarithmic function of a ratio between a total number of documents in a database and a total number of documents in which the word appears.

* * * * *